United States Patent
Khajepour et al.

(10) Patent No.: US 10,914,357 B2
(45) Date of Patent: Feb. 9, 2021

(54) MULTI-AXIS REACTION SYSTEM AND METHOD FOR VIBRATION CONTROL OF MECHANICAL SYSTEMS

(71) Applicant: Amir Khajepour, Waterloo (CA)

(72) Inventors: Amir Khajepour, Waterloo (CA); Mitchell Macleod Rushton, Hamilton (CA); Hamed Jamshidifar, Waterloo (CA)

(*) Notice: Subject to any disclaimer, the term of this patent is extended or adjusted under 35 U.S.C. 154(b) by 662 days.

(21) Appl. No.: 15/433,325

(22) Filed: Feb. 15, 2017

(65) Prior Publication Data
US 2018/0231100 A1    Aug. 16, 2018

(51) Int. Cl.
| | |
|---|---|
| F16F 15/22 | (2006.01) |
| F16F 15/02 | (2006.01) |
| G05B 19/402 | (2006.01) |
| B25J 9/00 | (2006.01) |
| B25J 19/00 | (2006.01) |
| F16F 7/10 | (2006.01) |

(52) U.S. Cl.
CPC ........... *F16F 15/223* (2013.01); *B25J 9/0078* (2013.01); *B25J 19/002* (2013.01); *F16F 15/02* (2013.01); *G05B 19/402* (2013.01); *F16F 7/1005* (2013.01); *G05B 2219/41191* (2013.01)

(58) Field of Classification Search
CPC ........ F16F 15/223; F16F 15/02; F16F 7/1005; B25J 9/0078; B25J 19/002; G05B 19/402; G05B 2219/41191
USPC ....................................................... 700/280
See application file for complete search history.

(56) References Cited

U.S. PATENT DOCUMENTS

| | | | |
|---|---|---|---|
| 4,741,303 A | 5/1988 | Kronich | |
| 2010/0034655 A1 | 2/2010 | Jolly et al. | |
| 2010/0107807 A1* | 5/2010 | Starossek ................ | F16F 15/02 74/570.2 |
| 2012/0227485 A1* | 9/2012 | Gregory .................. | G01M 1/36 73/460 |

FOREIGN PATENT DOCUMENTS

| | | | | |
|---|---|---|---|---|
| DE | 202012001439 | * | 4/2013 | |
| GB | 2538591 | | 11/2016 | |
| GB | 2538591 B | * | 11/2016 | ............ F16F 15/22 |

OTHER PUBLICATIONS

Canadian Intellectual Property Office as International Searching Authority, International Search Report for PCT/CA2018/050156, dated Apr. 30, 2018.
Canadian Intellectual Property Office as International Searching Authority, International Preliminary Report on Patentability for PCT/CA2018/050156, dated Aug. 20, 2019.

* cited by examiner

*Primary Examiner* — Kenneth M Lo
*Assistant Examiner* — Michael W Choi
(74) *Attorney, Agent, or Firm* — Gowlinq WLG (Canada) LLP; Jeffrey W. Wong

(57) ABSTRACT

The disclosure is directed at a method and apparatus for controlling unwanted vibrations in a mechanical system. The apparatus includes a set of different eccentric and/or concentric masses mounted to the mechanical system for generating forces to counteract the sensed unwanted vibrations. The apparatus further includes a set of motors that control movement of the set of masses.

15 Claims, 18 Drawing Sheets

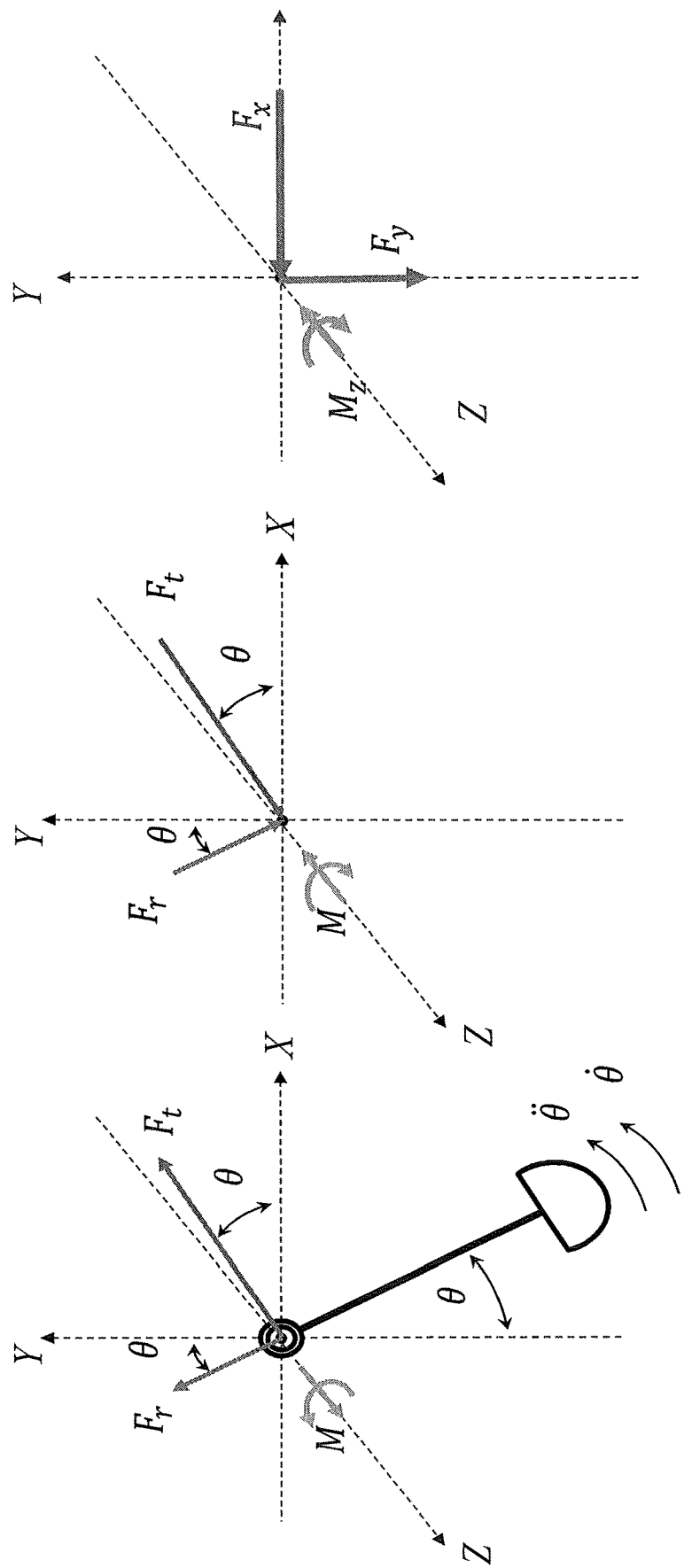

MULTI-AXIS REACTION SYSTEM AND METHOD FOR VIBRATION CONTROL OF MECHANICAL SYSTEMS

FIELD OF THE DISCLOSURE

The disclosure is generally directed at vibration control and, more specifically, is directed at a multi-axis reaction system and method for vibration control in a mechanical system.

BACKGROUND OF THE DISCLOSURE

Mechanical systems are used in many different engineering applications. In some cases, these mechanical systems experience undesired vibrations which typically affect operation and effectiveness of the mechanical systems. Different solutions have been implemented, however, in some cases, they are unable to control all of the undesired vibrations. For instance, in the field of cable robots.

Global economic competition has motivated manufacturing industries to seek robots that perform faster movements, thereby reducing production time and cost and gaining a competitive advantage. There is a strong trend towards non-automotive robot applications. Similarly, there is a growing interest in robotic applications in warehousing and distribution industries. Several industrial tasks require fast and precise repetitive movements; for instance, packaging, warehousing, machine loading and unloading, assembly, part transference, and material handling. Those tasks are called pick-and-place operations (PPO) and deal with grasping an object at one specific point, moving it to another predetermined place and then releasing it.

Therefore, there is provided a novel method and apparatus for vibration control in a mechanical system.

SUMMARY OF THE DISCLOSURE

The disclosure is directed at a method and system that is capable of attenuating undesired vibrations in all six spatial degrees of freedom for a fully-constrained planar cable driven parallel robot.

In one aspect of the disclosure, there is provided apparatus for vibration control of a mechanical system including a mounting structure to connect the apparatus for vibration control to a portion of the mechanical system; a set of at least two motors connected to the mounting structure, the set of motors including at least two motors co-linear with each other along a motor axis of rotation, the motor axis of rotation parallel to the portion of the mechanical system to which the mounting structure is connected; and a set of eccentric masses, the set of eccentric masses in a one-to-one relationship with the set of at least two motors.

In another aspect, each of the set of eccentric masses is connected to its associated motor at the motor axis of rotation. In yet a further aspect, an eccentric mass axis of rotation is different than the motor axis of rotation. Furthermore the set of eccentric masses may include at least two pendulum-shaped eccentric masses, wherein both of the pair of pendulum-shaped eccentric masses are connected to its associated motor at the motor axis of rotation. In a further aspect, the set of eccentric masses further includes a rotational disc eccentric mass connected to a motor within the set of at least two motors.

In another aspect, the set of eccentric masses include three pairs of pendulum-shaped eccentric masses, each of the three pair of pendulum-shaped eccentric masses connected to individual motors within the set of at least two motors along an axis of rotation of the mechanical system; and three rotational disc eccentric masses, each of the rotational disc eccentric masses connected to individual motors within the set of at least two motors along one of the axes of rotation of the mechanical system.

In yet a further aspect, the mechanical system is a cable robot including a platform. In another aspect, the mounting structure is connected to the platform. In one aspect, the mounting structure is connected to a bottom of the platform.

In another aspect of the disclosure, there is provided a method of vibration control for a mechanical system including obtaining measurements associated with undesired vibrations; calculating a set of torque and force measurements to counteract the undesired vibrations; converting the set of torque and force measurements to a set of eccentric masses movement instructions values; and actuating motors according to the set of eccentric masses movement instructions values to actuate the set of eccentric motors.

In yet another aspect, the set of eccentric masses movement instructions values are speed and phase values. In yet a further aspect, obtaining measurements includes retrieving the measurements associated with undesired vibrations from a set of sensors associated with the mechanical system. In another aspect, the set of eccentric masses include pendulum-shaped eccentric masses. In another aspect, the set of eccentric masses includes rotational disc eccentric masses.

In yet another aspect of the disclosure, there is provided a system for vibration control for a mechanical system including a set of at least two motors, the set of motors co-linear with each other along a motor axis of rotation; a set of at least two eccentric masses, the set of at least two eccentric masses connected to each of the set of at least two motors at the motor axis of rotation; wherein actuation of each of the set of at least two motors causes the set of at least two eccentric masses to rotate about the motor axis of rotation.

In another aspect, the set of at least two eccentric masses is in a one-to-one relationship with the set of at least two motors. In yet another aspect, a centre of gravity of each of the set of at least two eccentric masses is displaced from the motor axis of rotation.

DESCRIPTION OF THE DRAWINGS

Embodiments of the disclosure will now be described, by way of example only, with reference to the attached drawings, in which:

FIGS. 7a to 7c are a model of applied and reaction forces and moments for the eccentric mass of FIG. 5a;

FIGS. 8a and 8b are a model of the applied and reaction forces and moments for the concentric load (inertial disc) of FIG. 6a;

DETAILED DESCRIPTION

The disclosure is directed at a method and system for vibration control in a mechanical system. Examples of a mechanical system include, but are not limited to, a cable robot, a flexible structure, such as a bridge or airplane wings and other similar systems. The system of the disclosure may be seen as a multi-axis reaction apparatus or system. In one embodiment, the multi-axis reaction apparatus includes at least two motors which are co-linear with each other. Depending on the design of the apparatus, the apparatus further includes a concentric or eccentric inertial load with each of the at least two motors whereby the inertial loads may be rotated by its associated motor to produce a predetermined reaction force and torque which may be applied to the mechanical system in order to control vibration or to counteract any undesired vibrations that are being experienced by the mechanical system.

Figure 5C:
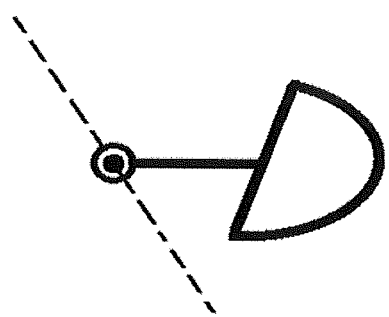
FIGS. 5a to 5c are schematic diagrams of an eccentric mass attached to an actuator.
Figure 5B:
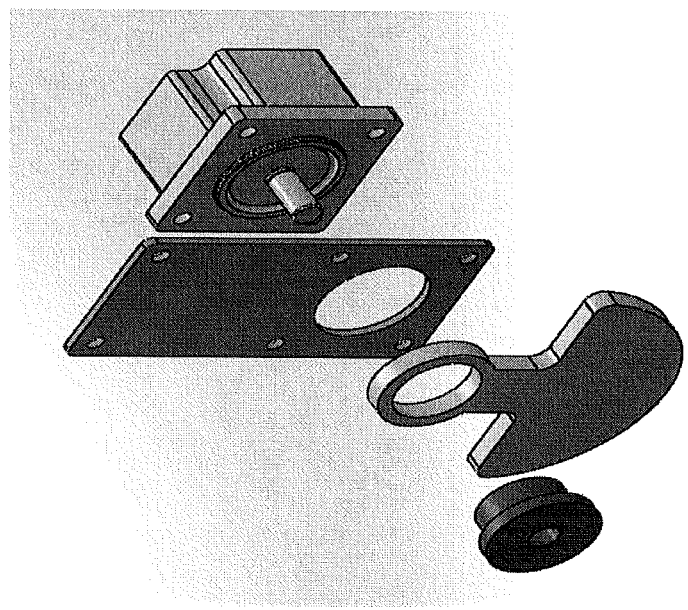
Figure 5A:
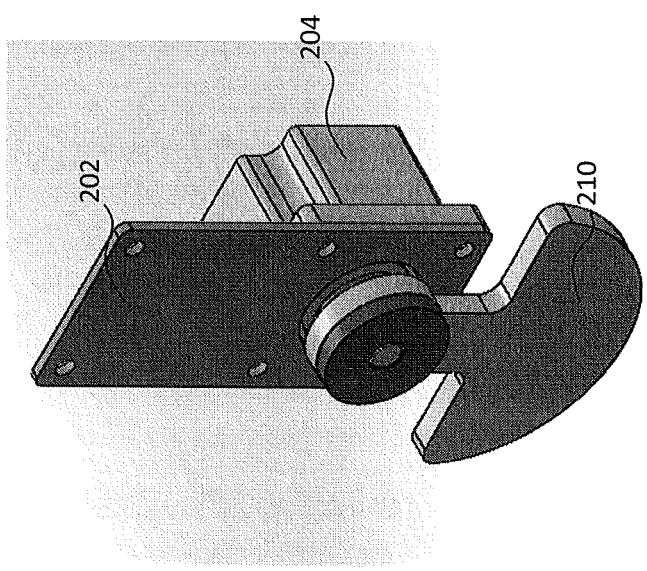

Turning to FIGS. 5a to 5c, diagrams of an eccentric mass mounted to an end effector in one embodiment of a system for vibration control is shown. FIG. 5a is a perspective view, FIG. 5b is an exploded view and FIG. 5c is a schematic model. As shown in FIG. 5c, the eccentric mass or eccentric inertial load (seen as pendulum 210) is fixed to the shaft of the rotational actuator, where the actuator is fixed to the connector plate. In a preferred embodiment, the connector plate is attached to the mechanical system. The general theory behind the development of the system for vibration control is provided. As will be understood, this theory may then be implemented into an actual system for vibration control such as disclosed with respect to FIG. 2.

In such a configuration, when the actuator oscillates the pendulum-shaped eccentric mass 210 with an amplitude ($\theta_0$) and a desired frequency f, represented by $\theta = \theta_0 \sin(2\pi f t)$, as shown in FIGS. 7a to 7c, two harmonic oscillatory reaction forces (seen as $F_t = mr\ddot{\theta}$ and $F_r = mr\dot{\theta}^2$) and a harmonic moment of $M = I_o \ddot{\theta}$, are generated and applied to the actuator base. $I_o$, m, r denote the pendulum's mass moment of inertia, mass, and distance from its mass center to axis of rotation respectively while $\ddot{\theta}$, $\dot{\theta}$, and $\theta$ are the pendulum angular acceleration, angular velocity, and rotational angle, respectively. By adjusting the amplitude $\theta_0$ and frequency f, the desired reaction forces Ft and Fr as well as the reaction, or harmonic, moment M can be changed.

Figure 9C:
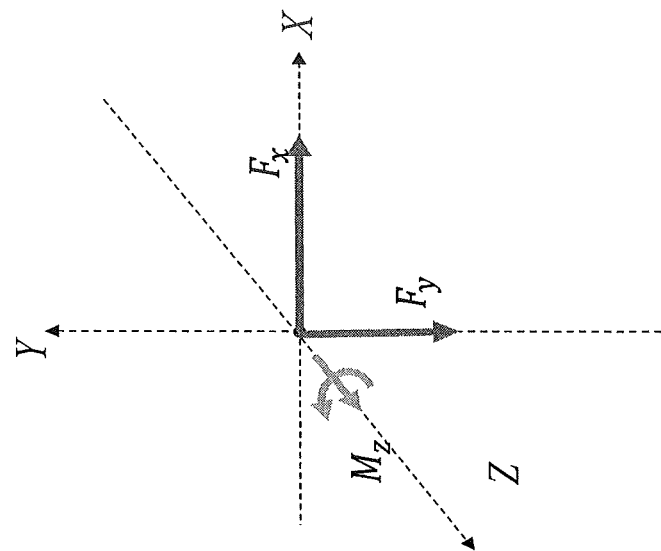
FIGS. 9a to 9c are a model for the applied and reaction forces and moments for a pair of pendulum shaped eccentric masses contained within the same plane of rotation and with different oscillation phases, frequencies, or amplitudes about a common rotational axis.
Figure 9B:
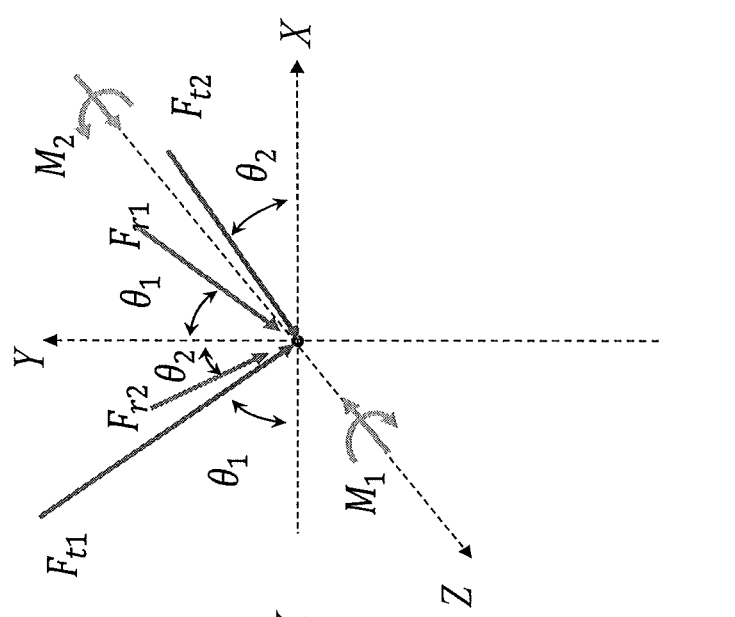
Figure 9A:
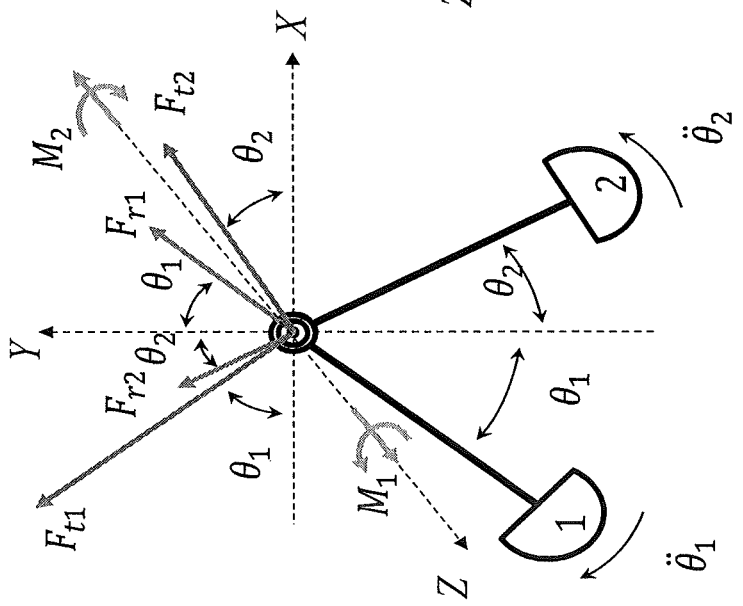

By adding a second eccentric mass to the same axis of rotation, such as schematically shown in FIGS. 9a to 9c, further reaction forces as well as a reaction torque can be generated by the system for vibration control and applied to the connector plate (and therefore, the mechanical system). For the illustrated general case, the reaction forces and moment. Illustrated in FIGS. 9a to 9c, may be represented as $F_x = F_{t1} \cos(\theta_1) - F_{t2} \cos(\theta_2) + F_{r2} \sin(\theta_2) - F_{r1} \sin(\theta_1)$,
$F_y = F_{t1} \sin(\theta_1) + F_{t2} \sin(\theta_2) + F_{r2} \cos(\theta_2) + F_{r1} \cos(\theta_1), M_z = M_2 - M_1$, respectively.

Figure 10C:
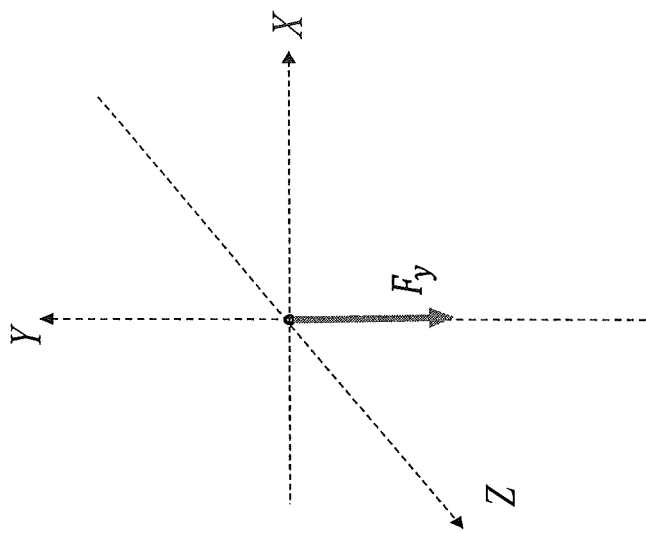
FIGS. 10a to 10c are a model for the applied and reaction forces and moments for a pair of pendulum shaped eccentric masses contained within the same plane of rotation and with the same oscillation phase, frequency, and amplitude in reverse directions about a common rotational axis.
Figure 10B:
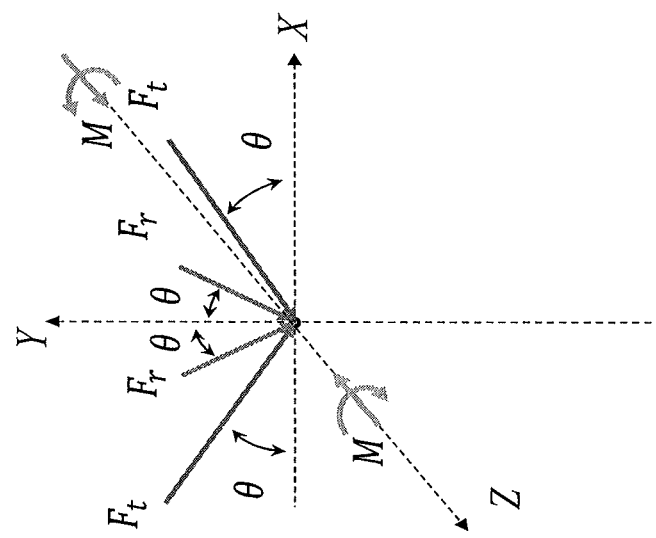
Figure 10A:
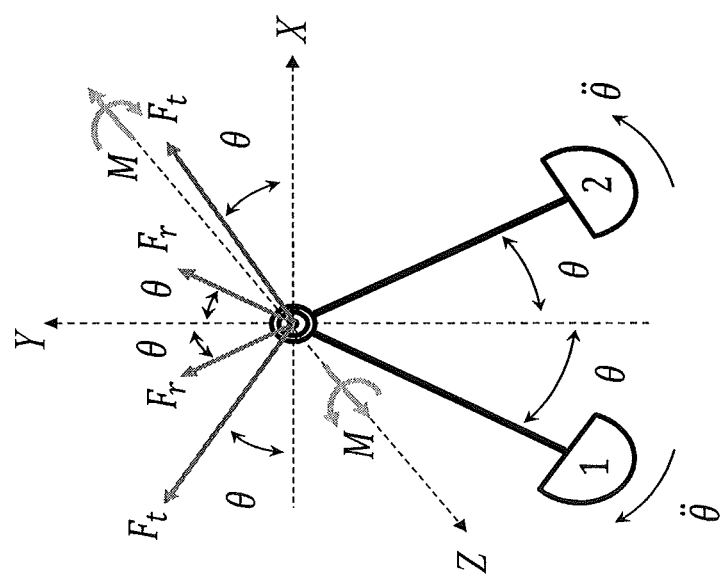

By selecting different motion directions and initial orientations for the eccentric loads, different oscillatory reaction forces/moments may be provided or applied. For example, as shown in FIG. 10a (which can be seen as a first embodiment of an eccentric mass starting orientation), if both eccentric masses are in the same orientation at the start or, in other words, are in the same orientation in the rest position, opposite pendulum oscillations with equal amplitude and frequency result in reaction forces/moments as illustrated in FIG. 10b. In this case, $M_1$ and $M_2$ as well as the projection of reaction forces in X direction are equal but in opposite directions that cancel each other's effects, where the projected reaction forces in the Y direction are in the same direction, and as shown in FIG. 10c, result into a pure oscillating force of $F_y = 2F_t \sin(\theta) + 2F_r \cos(\theta)$ in this direction. As shown in FIGS. 10a to 10c, the two pendulums, or masses, can provide a force of $F_y$ that is perpendicular to the axis of rotation 216.

Figures 11A, 11B, 11C:
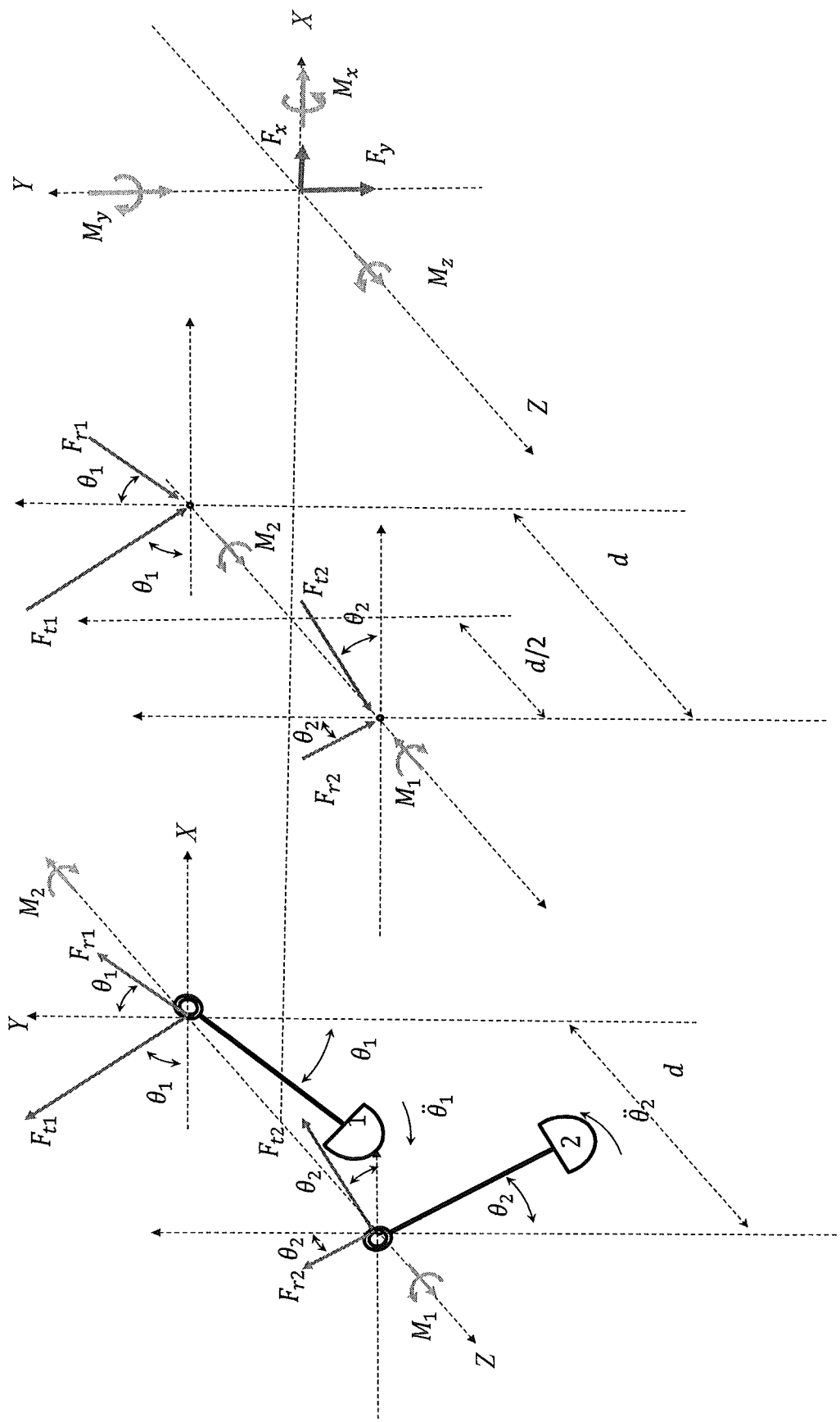
FIG. 11a to 11c are a model for the applied and reaction forces and moments for a pair of pendulum shaped eccentric masses contained in parallel planes of rotation with an offset of d and with arbitrary oscillation phases, frequencies and amplitudes about a common rotational axis.
Figures 12A, 12B, 12C:
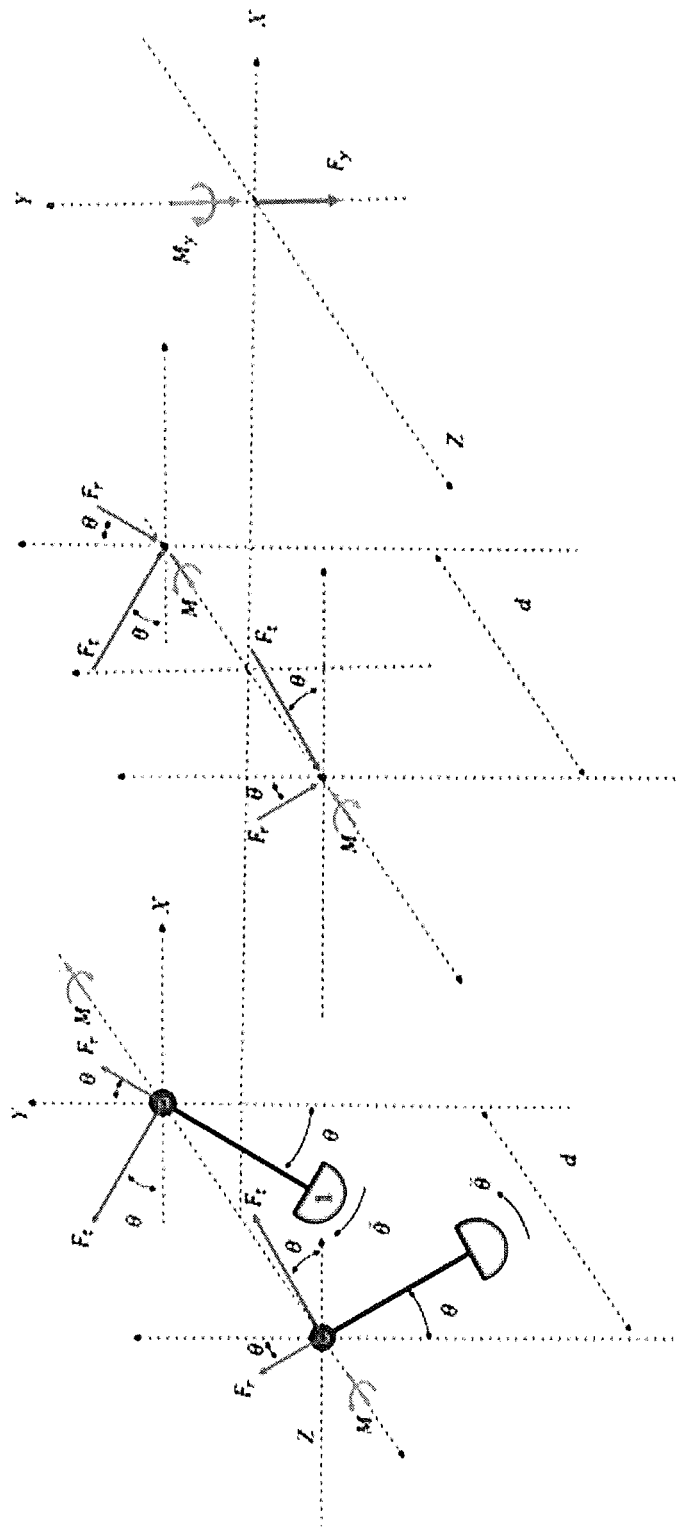
FIGS. 12a to 12c are a model for the applied and reaction forces and moments for a pair of pendulum shaped eccentric masses contained in parallel planes of rotation with an offset of d and with the same oscillation phase, frequency, and amplitude in reverse directions about a common rotational axis.

Turning to FIGS. 11a to 11c, schematic views of the same system with an offset distance of d between the planes of pendulums are shown. In this case, $F_x = F_{t1} \cos(\theta_1) - F_{t2} \cos(\theta_2) + F_{r2} \sin(\theta_2) - F_{r1} \sin(\theta_1)$,
$F_y = F_{t1} \sin(\theta_1) + F_{t2} \sin(\theta_2) + F_{r2} \cos(\theta_2) + F_{r1} \cos(\theta_1)$ are the reaction forces and $$M_z = M_1 - M_2,$$

$$M_y = F_{t1}\frac{d}{2}\cos(\theta_1) + F_{t2}\frac{d}{2}\cos(\theta_2) - F_{r2}\frac{d}{2}\sin(\theta_2) + F_{r1}\frac{d}{2}\sin(\theta_1),$$

$$M_x = -F_{t1}\frac{d}{2}\sin(\theta_1) + F_{t2}\frac{d}{2}\sin(\theta_2) + F_{r2}\frac{d}{2}\cos(\theta_2) - F_{r1}\frac{d}{2}\cos(\theta_1)$$

are the reaction moments which are calculated in the midpoint of connection line, as shown in FIG. 12c.

Turning to FIG. 12a, a schematic view of the same system with an offset distance of d between the planes of the pendulums is shown. In this case, $M_1=M$ and $M_2=M$ are still cancelling each other, however, a reaction moment of $M_y=F_x d \cos(\theta)-F_r d \sin(\theta)$ as well as $F_y$ are applied, as shown in FIG. 12c.

Figure 6C:
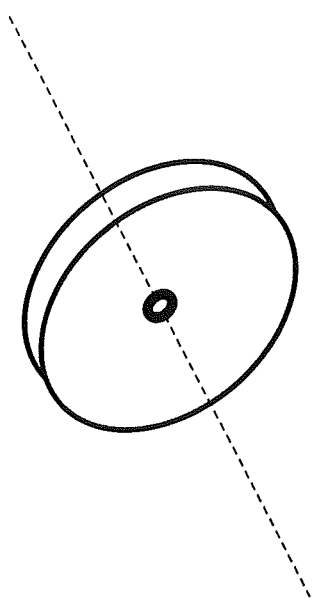
FIGS. 6a to 6c are schematic diagrams of a concentric mass or inertial disc mounted to an actuator.
Figure 6B:
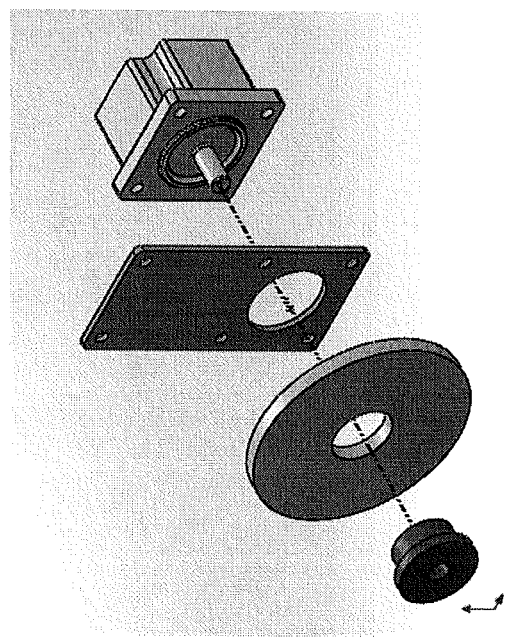
Figure 6A:
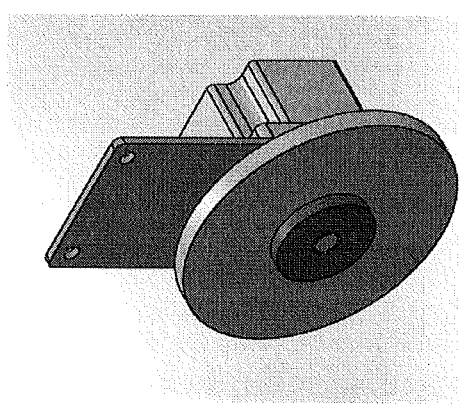
Figure 8A:
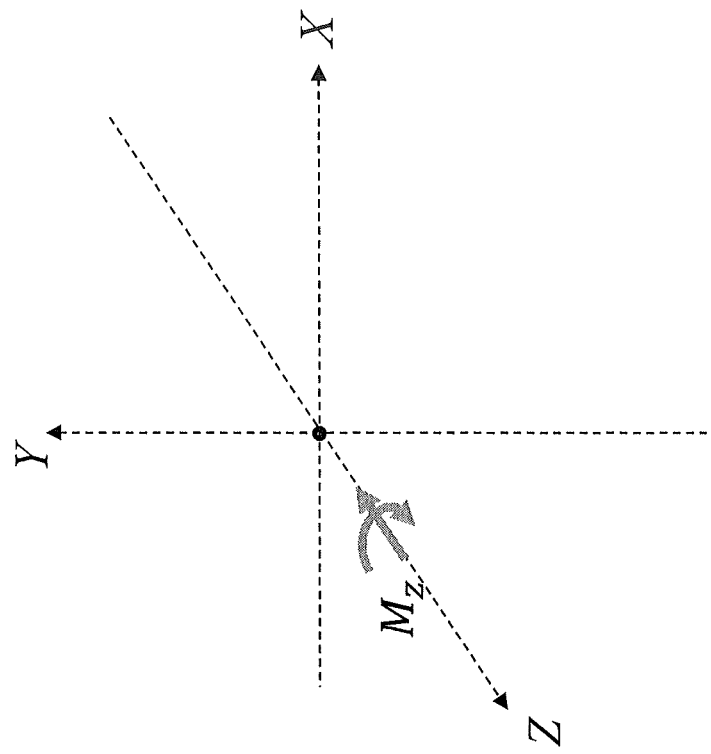
Figure 8B:
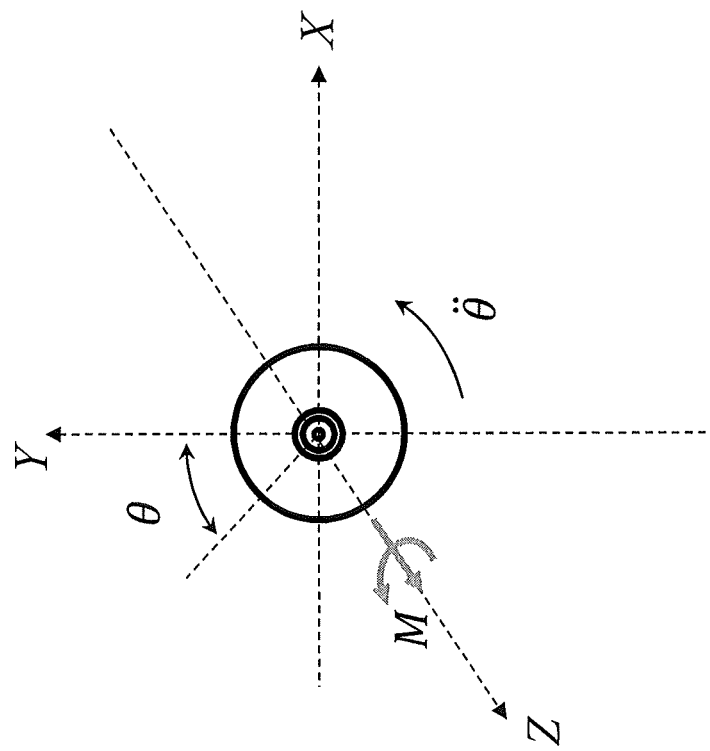

In another embodiment, the eccentric masses may be an oscillatory reaction disc as schematically shown in FIGS. 6a to 6c. Use of a reaction disc allows a pure oscillatory moment to be generated to cancel, or counteract, the unnecessary moments of the multi-axis reaction system or to add a moment in a desired direction. As shown in FIGS. 8a to 8c, the oscillatory disc can provide only an axial reaction moment. The oscillatory reaction disc may be used as the only inertial load or may be combined with the pendulum-shaped eccentric masses as discussed above.

Figures 13A, 13B, 13C, 13D:
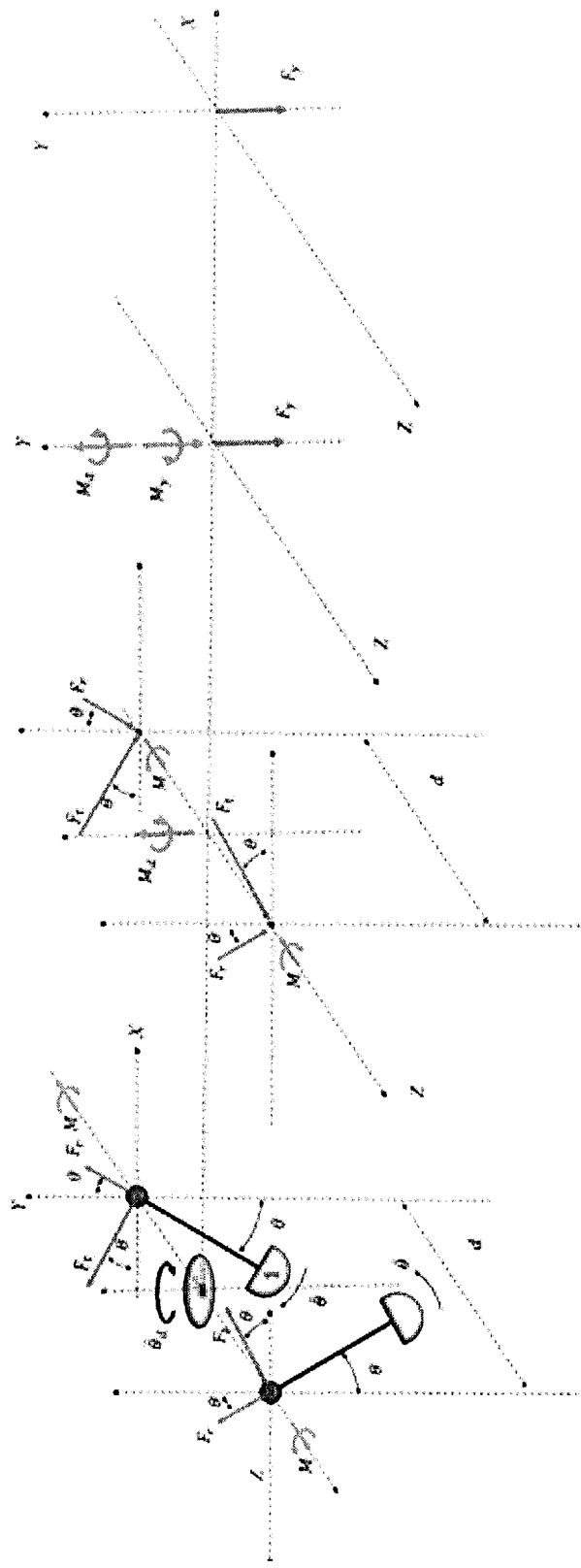
FIGS. 13a to 13d are a model for the applied and reaction forces and moments for an inertial disk along with a pair of pendulum shaped eccentric masses contained in parallel planes of rotation with an offset of d and with the same oscillation phase, frequency, and amplitude in reverse directions about a common rotational axis.

Turning to FIG. 13a, the schematic embodiment of the multi-axis reaction system of FIGS. 12a to 12c are shown wherein the set of masses include a reaction disc is preferably mounted at a center point between the connection points of the pendulum eccentric masses and the disc's axis of rotation is perpendicular to the pendulums rotational axes. As can be seen in the force map of FIG. 13d, the system can generate a pure oscillatory force by using the reaction disc to cancel the resultant moment of the pendulum loads or to provide a desired moment in that direction.

Figures 14A, 14B, 14C, 14D:
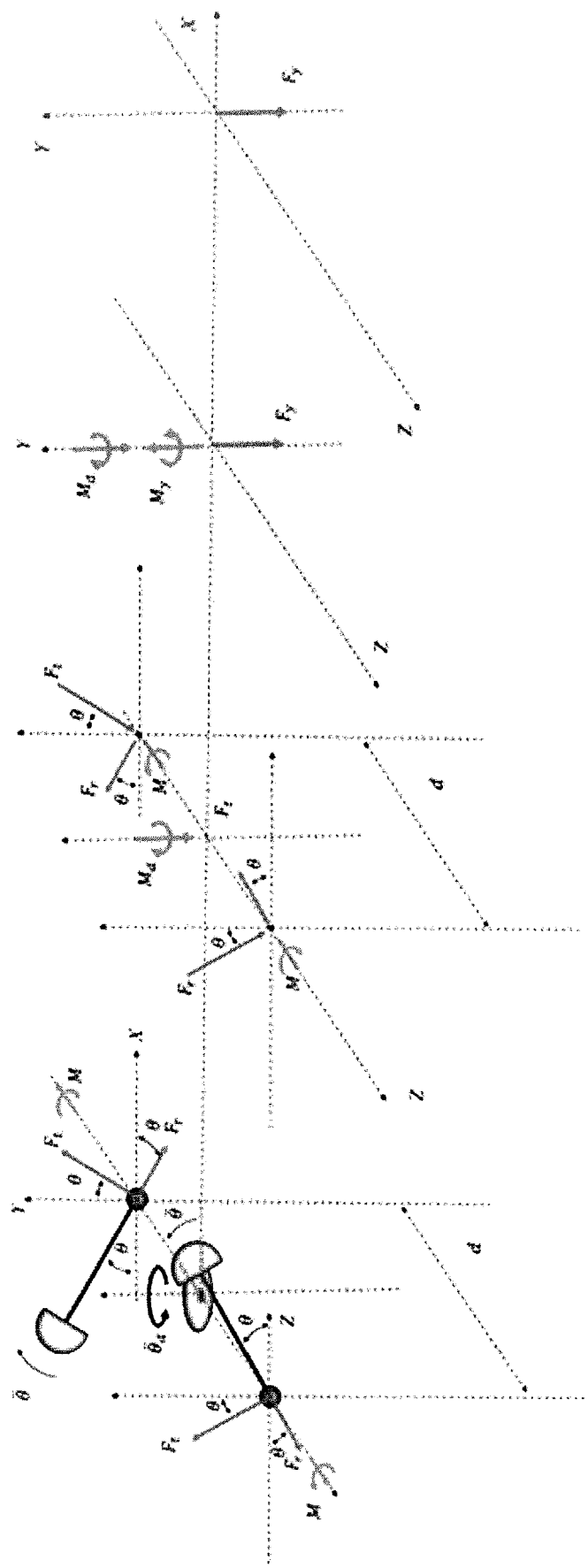
FIGS. 14a to 14d are a model for the applied and reaction forces and moments for a rotational disc along with a pair of pendulum shaped eccentric masses contained in parallel planes of rotation with an offset of d and with the same oscillation phase, frequency, and amplitude in reverse directions about a common rotational axis with 180 degrees initial phase offset.

Turning to FIG. 14a, a schematic view of a second embodiment of an eccentric mass starting orientation is shown. The starting positions, or orientations, of the eccentric masses have an impact on the generated forces/moments. For example, if the eccentric mass starting orientation is as shown in FIG. 14a, $F_y$ and $M_y$ are resulted as $F_y=2F_t \sin(\theta)+2F_r \cos(\theta)$ and $M_y=F_t d \sin(\theta)+F_r d \cos(\theta)$.

By understanding the values of the inertial loads, using the force, torque and moment equations, the necessary forces may be generated by the system of the disclosure to counteract the undesired vibrations of the mechanical system. In one embodiment, the undesired vibrations may be measured or sensed by sensors located on or around the mechanical system.

Figures 15, 16:
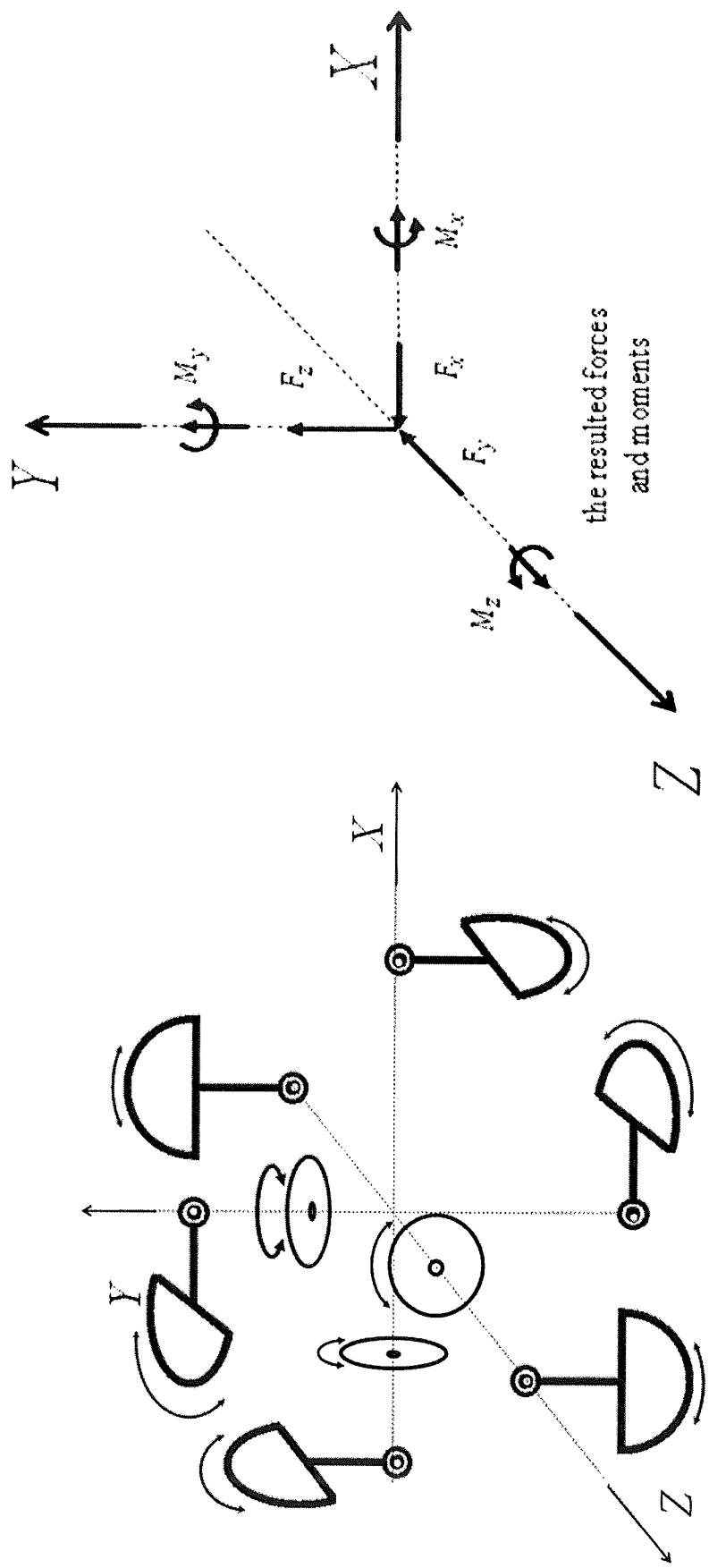
FIG. 15 is a model of a general multi-axis reaction system.
FIG. 16 is a schematic diagram of forces and moments generated by the general multi-axis reaction system.

According to the examples and configurations discussed above, different arrangements of inertial loads in the proposed multi-axis reaction system can be used to provide desired oscillatory forces and/or moments. FIGS. 15 and 16 schematically show a general embodiment of a system for vibration control and a resultant force map, respectively. A combination of two reaction pendulums and a disc as shown in Figure FIGS. 13a to 13d can generate a pure force while a reaction disc can generate a pure moment, hence, a general multi-axis reaction system with six pendulum-shaped eccentric masses and three discs, as shown in FIG. 15, can generate all three forces and three moments necessary for controlling any rotational and translational undesired vibrations in mechanical systems. FIG. 16 shows the force map for the three forces and three moments of a general multi-axis reaction system.

Figure 1:
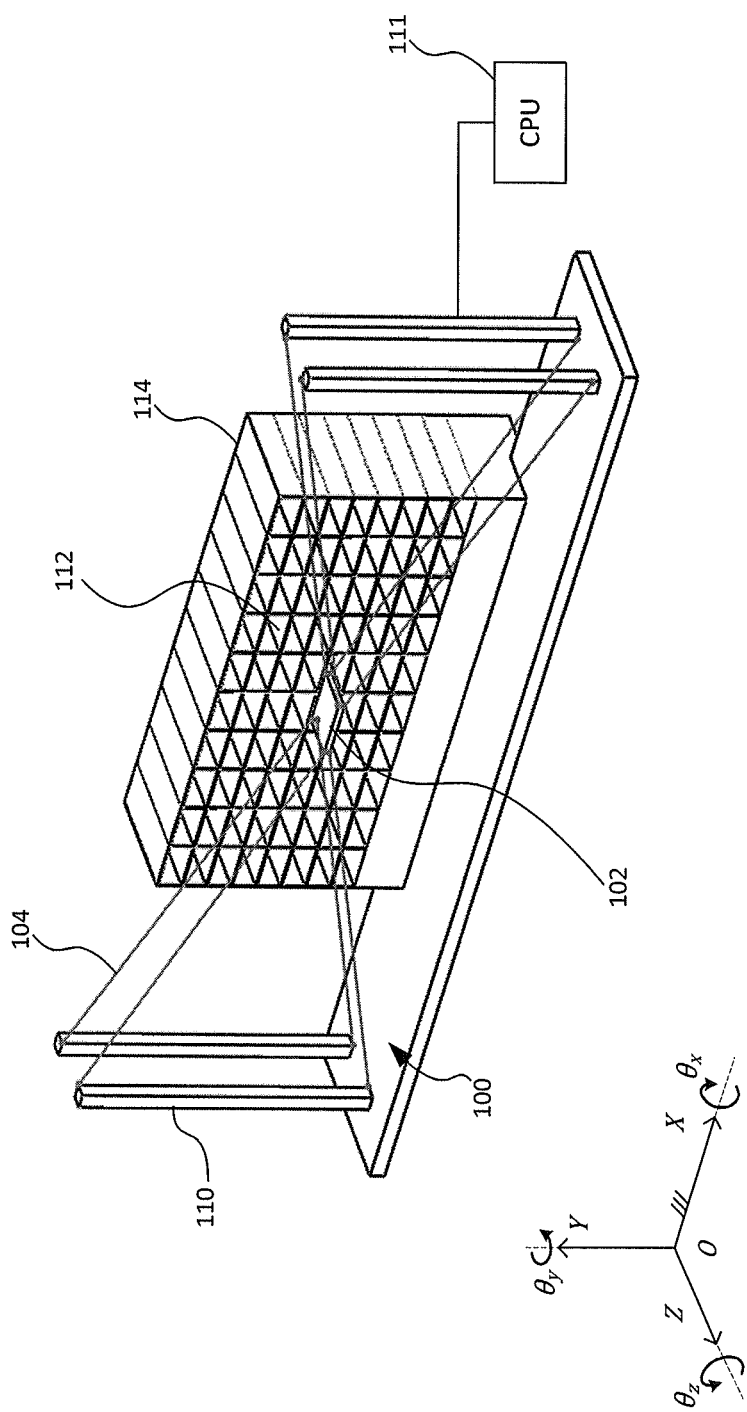
FIG. 1 is a perspective view of a cable robot.

Turning to FIG. 1, a perspective view of an embodiment of a mechanical system which may benefit from the system for vibration control is shown. In the current figure, the mechanical system is a cable robot. The warehousing cable robot 100 includes a platform 102 from which a set of cables 104 extend. At one end, or a first end, of each cable 104, the cable 104 is connected to the platform 102 and at the opposite, or second end, the cable 104 is connected to a motor or a winch (not shown) that is actuated by a motor for controlling a length or tension in the cable 104. The warehousing robot 100 may further include a cable controlling apparatus or mechanism for receiving and/or collecting the cable that is controlled by the, preferably, rotary motor.

As schematically shown in FIG. 1, the apparatus 100 may further include a frame 110 which supports the platform 102 and the cables 104. Although not shown, the cable controlling mechanism and the motor may be mounted within or to the frame 110. Control of the cable robot is via a central processing unit (CPU) 111. It will be understood that the warehousing robot 100 may include other components necessary for operation or for other functionality, however, these are not shown as the disclosure is directed at the apparatus for controlling undesired vibrations of the platform to reduce or prevent unwanted motion of the platform when the warehousing robot is in use.

In operation, a user can control the cable robot 100 to obtain items from the slots 112 of a shelving unit 114 located within a warehouse. Although not shown, the cable robot 100 may further include a robot arm or the like, which may be mounted or connected to the platform 102, to reach into the slots 112 to retrieve the requested item. After obtaining the item, the platform 102 is controlled to deliver the item to the user or to a specified location. The delivery of the item will be understood by one skilled in the art.

When an item is requested, a signal is transmitted via the CPU 111 to the cable robot 100 identifying the location of the requested item. Alternatively, the CPU may transmit signals to the motor and cable controlling mechanism to move the platform. The platform 102 is then moved to the item location whereby the item is then retrieved and placed on the platform 102. In many cases, the warehousing robot 100 is associated with a wall or shelf of objects and therefore, once the warehousing robot 102 receives the signal, the platform is controlled to move parallel to the shelf to locate the object in the XY plane and then controlled to move perpendicular to the wall (in the Z-plane) to retrieve the object. While some unnecessary movement of the platform in certain degrees of freedom may be controlled via the cables 104, such as via kinematic constraints, there still exists further undesired vibrations in the translation about the planar normal axis and rotation about the two planar axes which are uncontrolled, and uncontrollable, via the cables 104. Therefore, there is provided a system for vibration control of these undesired vibrations.

By controlling the tensions of cables, the vibration of the platform can be controlled however, depending on the configuration and design of cable robot, controllability conditions of the moving platform in some directions may not be possible. In such cable robots, the vibrations of the platform in all directions cannot be controlled simply by controlling the tension of the cables. Accordingly, a multi-axis reaction system (as schematically disclosed above) attached to the platform can be used to provide the required forces/moments to effectively reduce or eliminate undesired vibrations of the platform.

Depending on the arrangement of the cables and the controllability conditions, different multi-axis reaction systems can be used. As an example, in planar cable robots which are used for warehousing applications, as shown in FIG. 1, using the tension of the cables, any desired forces in x, y directions, denoted $F_x$ and $F_y$, as well as any desired moment in the z-direction, denoted by $M_z$, can be provided by the cables. Using $F_x$, $F_y$ and $M_z$, the platform's planar vibrations (in x, y and $\theta_z$ directions) can be controlled. However, with respect to out-of-plane disturbances the platform is faced with out-of-plane vibrations (in the z, $\theta_y$ and θ$_x$ directions). These vibrations cannot be controlled by simply changing the tension of the cables. In such conditions, integrating the multi-axis reaction system can provide desired forces and/or torques to counteract all of these undesired vibrations experienced by the platform.

Figure 2:
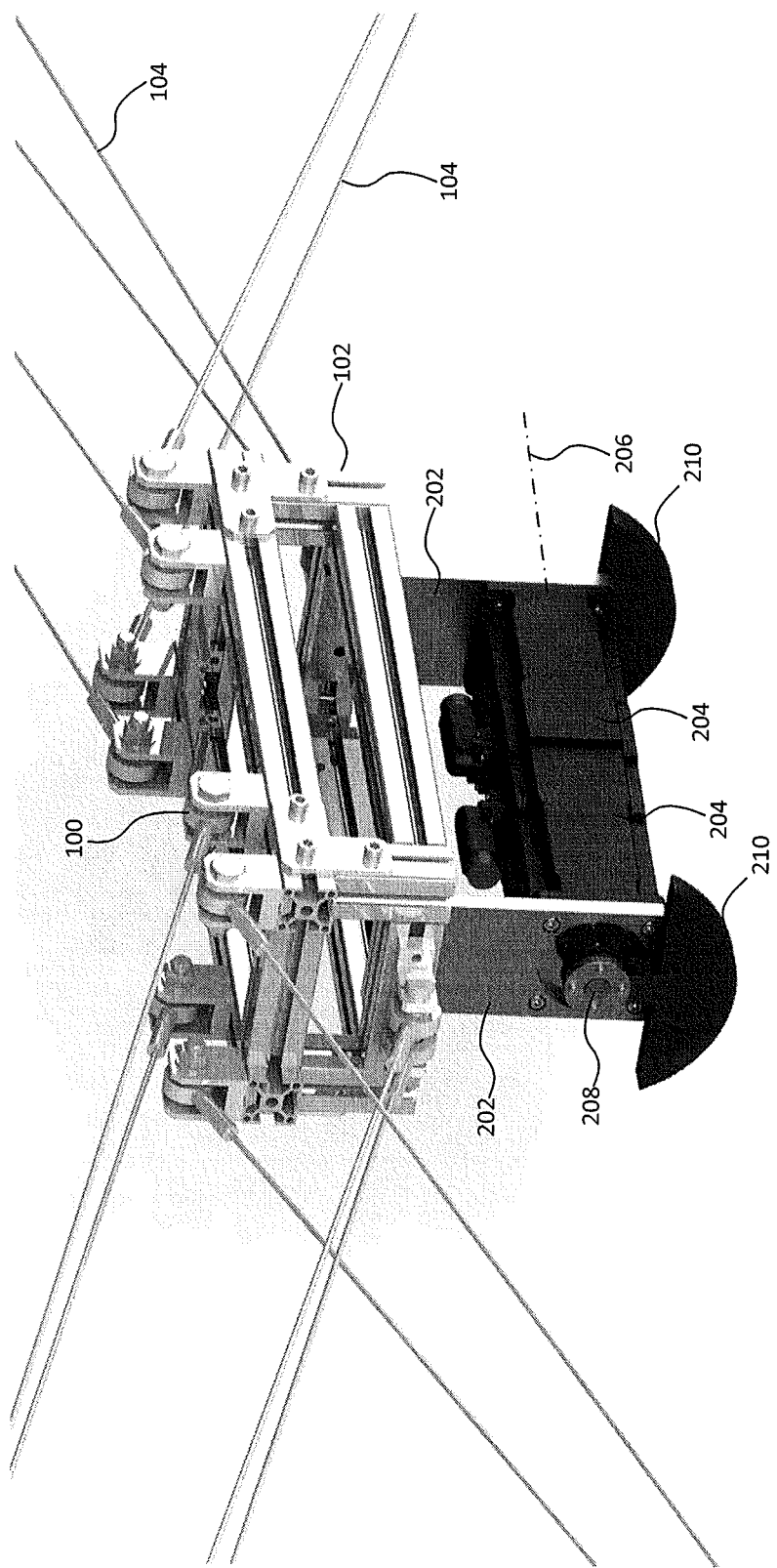
FIG. 2 is a schematic diagram of a multiaxis reaction system for vibration control mounted to a platform of a cable robot.

Turning to FIG. 2, a schematic diagram of one embodiment of a multi-axis reaction system for vibration control of the cable robot is shown. The system of FIG. 2 is used to control undesired vibrations in the translation about the planar normal axis and rotation about the two planar axes. From a theoretical point of view, adding the multi-axis reaction system can provide a number of actuation inputs (forces and/or moments) to provide controllability conditions for the control of the platform. An explanation of controllability conditions and the conditions of the planar cable robots with and without the multi-axis reaction system are discussed below.

The system 200 is shown mounted to the bottom of a platform 102 of the warehousing robot 100 with cables 104 extending from the platform 102. The system 200 is preferably mounted to the platform 102.

The system 200 includes a pair of connector plates, or walls, 202 which are fixed to the platform via fasteners, such as bolts and nuts and a set of at least two motors 204 which are mounted to the walls 202. In the current embodiment, the set of motors includes two motors that are located adjacent each other and share a single axis of rotation 206. In this manner, the motors 204 may be seen as being co-linear with respect to each other. In a preferred embodiment, the axis of rotation is parallel to the platform 102.

Looking at one motor and wall pair, at each end of the motor is an end effector 208 which extends through a hole in the wall 202. Mounting of the motor to the wall will be understood by one skilled in the art. The system 200 further includes a set of loads, seen as eccentric masses 210, preferably in a one-to-one relationship with each of the set of motors 204. In some embodiments, the individual loads may be seen as being asymmetric eccentric masses. Each eccentric mass 210 is mounted to, or engaged with, the end effector 208 of its associated motor 204 about the axis of rotation 206. An example of an eccentric mass is shown in FIG. 3.

As can be seen, while the inertial loads 210 are mounted to the axis of rotation 206, the actual centre of gravity of each load 210 does not correspond with the axis of rotation 206 but is displaced a predetermined distance from the axis 206. The predetermined distance and the weight of the pendulum is preferably stored in the memory of CPU 111. In the current embodiment, due to the unbalanced nature, or mass, of the pendulum shaped eccentric mass, an applied torque along the motor shaft (about the axis of rotation) generates a set of forces and moments such as disclosed above with respect to the force maps. Depending on where the eccentric mass is mounted to the mechanical system, the reaction force from the load also generates a secondary set of reaction moments, due the displacement of the force from the various rotational axes.

Figure 3:
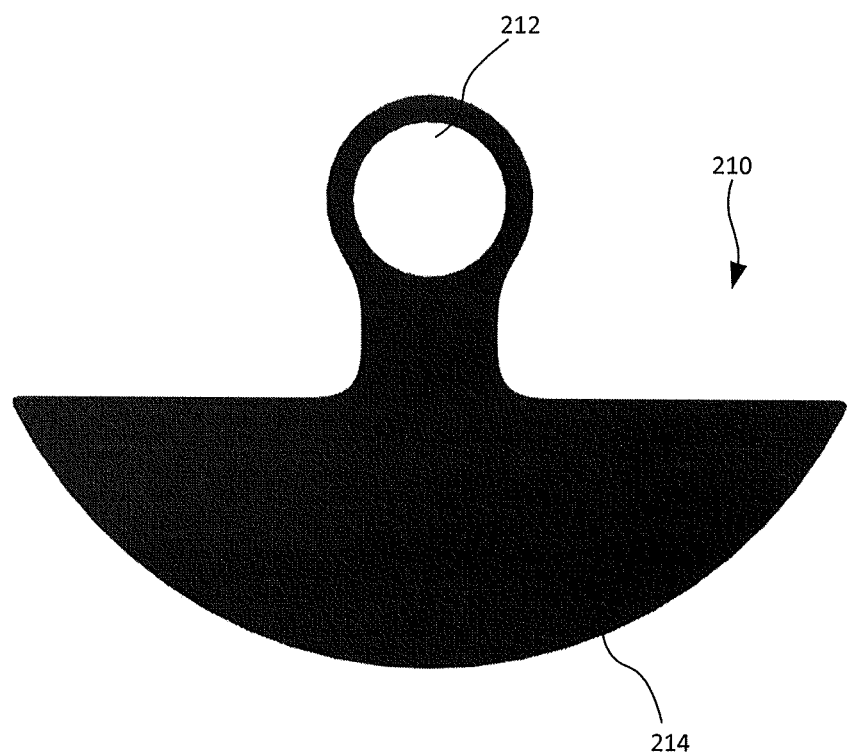
FIG. 3 is a schematic diagram of an eccentric mass for use with the system for vibration control.

As can be seen in FIG. 3, in one embodiment, the eccentric mass 210 is preferably pendulum shaped with a hole 212 at one end (to receive the end effector 208) and a pendulum portion 214 at an opposite end. The hole 212 mates with, or is attached to a shaft of the end effector 208 and is then mounted to, or attached to the end effector 208 in any number of known methods such that rotation of the end effector 208 causes the pendulum portion 214 of the load 210 to move or rotate. In other words, actuation of the motor preferably causes the pendulum portion 214 of the load 210 to rotate at a predetermined angle and/or speed about the axis of rotation 206. Movement of each eccentric mass generates a force and/or torque that may be then applied to or experienced by the platform 102. In a preferred embodiment, the force or forces and/or the torque or torques that are generated by the vibration control system 200 may be used to counteract or control the undesired vibrations being experienced by the platform 102.

A discussion of the forces generated by the loads and applied to the platform for vibration control is disclosed above with respect to the examples of FIGS. 7 to 14.

Figure 4:
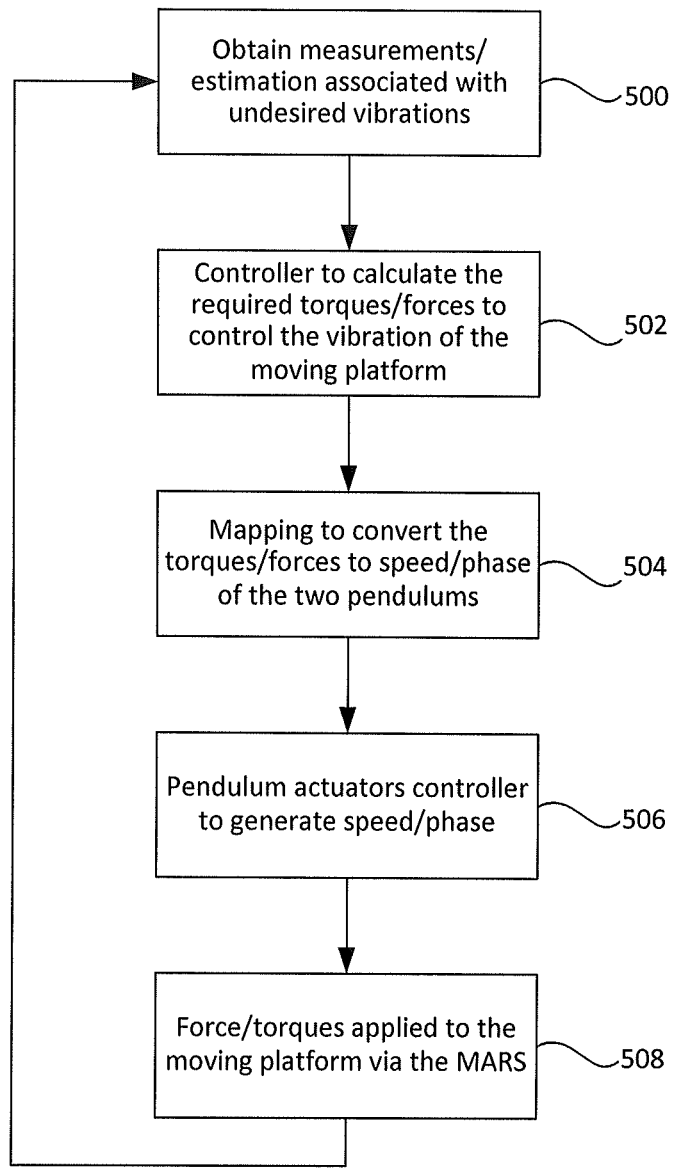
FIG. 4 is a flowchart outlining a method of vibration control of a moving platform of a cable robot using the multiaxis reaction system.

Turning to FIG. 4, a flowchart outlining a method of vibration control is shown. Initially, measurements/estimations associated with undesired vibrations being experienced by the platform (or mechanical system) are obtained 500. The position of the moving platform and/or its undesired vibrations can be measured directly via sensors such as cameras and accelerometers, or estimated using different estimation methods. These techniques will be understood by one skilled in the art. In the case of the mechanical system being a cable robot, these undesired vibrations represent the vibrations which are not currently controlled by the cables.

The required torques/forces to control the undesired vibrations are then calculated 502. This may be performed by a controller of the system of the disclosure or by a processor. A mapping is then performed to convert the torques/forces into speed and phase values 504 for movement of the loads (which for a cable robot is preferably two pendulum loads). Controllers associated with the motors then actuate 506 the motors to generate the necessary speed and phase to move the pendulums whereby the torque/forces are then applied to the platform to counteract the undesired vibrations 508. This is then continuously repeated to assist in controlling and counteracting the undesired vibrations being experienced by the mechanical system (or platform in the case of a cable robot).

Figure 18:
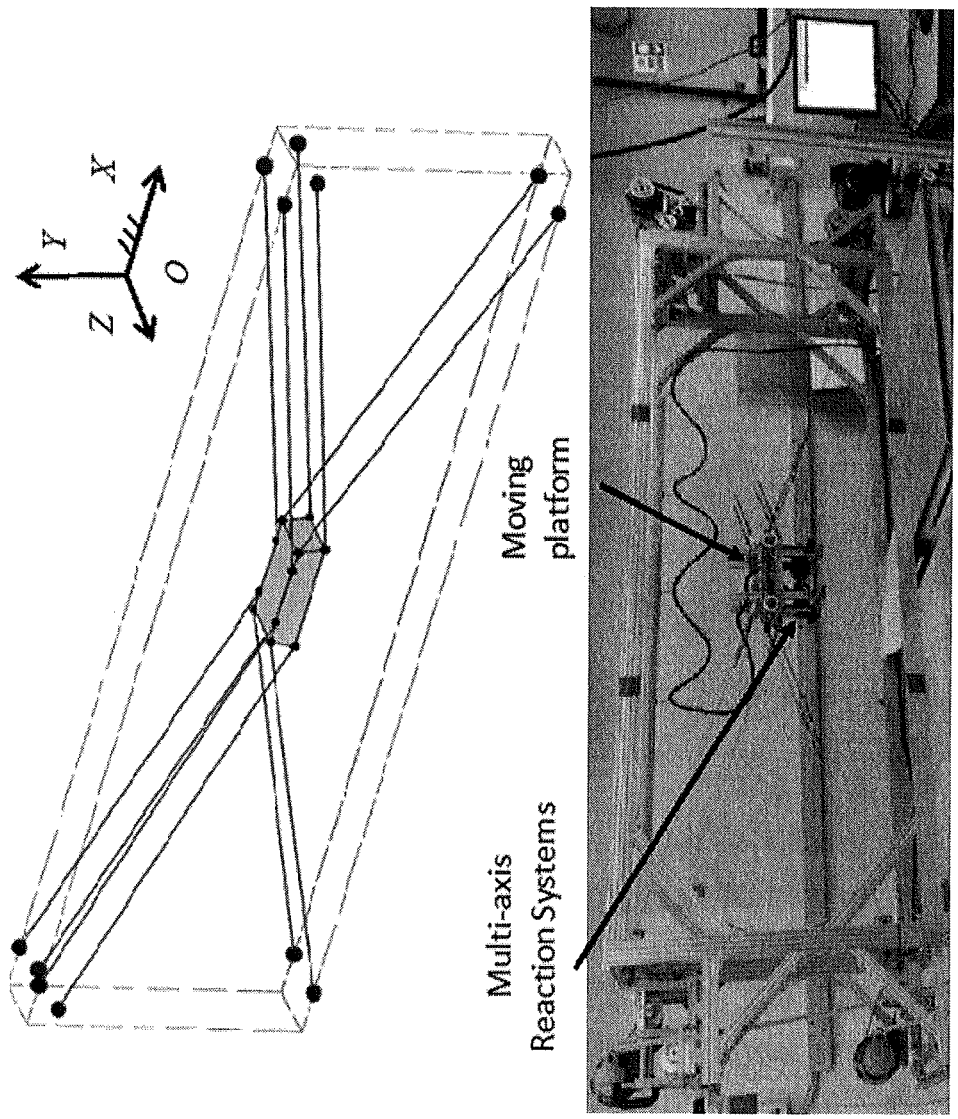
FIG. 18 are schematics of a cable robot used for experimentation.

In one experiment, a study was performed on a planar cable robot with and without the multi-axis reaction system. The system that was tested is schematically shown in FIG. 18. In the experiment, the cable robot included four actuators and 12 cables whereby the motion of the platform was controlled in the X-Y plane. The connection point co-ordinates on the moving and fixed platform are denoted respectively by $r_{c,i}$ and $b_i$. Table 1 provides the coordinates for all of the cables:

TABLE 1

| Cable | $r_{c,i}$ [m] | | | $b_i$ [m] | | |
|---|---|---|---|---|---|---|
| Index | x | y | z | x | y | z |
| 1 | 0.152 | 0.048 | 0.065 | 1.50 | 0.500 | 0.000 |
| 2 | 0.232 | −0.048 | 0.000 | 1.58 | 0.404 | 0.065 |
| 3 | 0.222 | −0.017 | 0.087 | 1.50 | −0.500 | 0.000 |
| 4 | −0.222 | −0.017 | 0.087 | −1.50 | −0.500 | 0.000 |
| 5 | −0.232 | −0.048 | 0.000 | −1.58 | 0.404 | 0.065 |
| 6 | −0.152 | 0.048 | 0.065 | −1.50 | 0.500 | 0.000 |
| 7 | 0.152 | 0.048 | −0.065 | 1.50 | 0.500 | 0.000 |
| 8 | 0.232 | −0.048 | 0.000 | 1.58 | 0.404 | −0.065 |
| 9 | 0.222 | −0.017 | −0.087 | 1.50 | −0.500 | 0.000 |
| 10 | −0.222 | −0.017 | −0.087 | −1.50 | −0.500 | 0.000 |
| 11 | −0.232 | −0.048 | 0.000 | −1.58 | 0.404 | −0.065 |
| 12 | −0.152 | 0.048 | −0.065 | −1.50 | 0.500 | 0.000 |

To check the controllability of the illustrated system in all six degrees of freedom (DOF), the nonlinear equation of the moving platform is derived first.

Using the Newton-Euler equations of motion, the motion equation of the platform in FIG. 18 can be written as:

$$M_p \ddot{p} = F_c + m_p g$$

$$I_p \dot{\omega} = M_c - \omega \times (I_p \omega)$$

where $m_p$ is the mass of the platform, g is the gravitational acceleration vector, $M_p = m_p I_{3 \times 3}$ and $I_p$ are the mass and inertia matrices associated with the mobile box, w is the vector of angular velocities, and $F_c$ and $M_c$ are the force and moment vectors provided by the cables which are a function of p, q and u.

Considering the Euler transformation matrix $$R_r = \begin{bmatrix} \cos(\phi)\cos(\theta) & \sin(\phi) & 0 \\ -\cos(\theta)\cos(\phi) & \cos(\phi) & 0 \\ \sin(\theta) & 0 & 1 \end{bmatrix}$$

the dynamic equations of the platform can be re-written as:

$$\ddot{p} = M_p^{-1}(F_c + m_p g)$$

$$\ddot{q} = R_r^{-1}[I_p^{-1}(M_c - (R_r \dot{q}) \times (I_b R_r \dot{q})) - \dot{R}_r \dot{q}]$$

Using the equations above, the following nonlinear state space model can be defined:

$$\dot{X} = \begin{bmatrix} \dot{p} \\ M_p^{-1}(F_c + m_p g) \\ \dot{q} \\ R_r^{-1}[I_p^{-1}(M_c - (R_r \dot{q}) \times (I_b R_r \dot{q})) - \dot{R}_r \dot{q}] \end{bmatrix}$$

The resulting non-linear state space model can be linearized using Taylor series expansion about an equilibrium point. Any location within the plane of the platform can be used as a potential equilibrium point so long as the elements of u are chosen such that the cable tensions hold the platform in a state of static equilibrium.

Linearizing this equation at any arbitrary point of the workspace provides the state space equation:

$$\dot{X} = A_{12 \times 12} X + B_{12 \times 4} u$$

where A and B are two matrices that depend on the cable properties, their attachment points, and moving platform inertia properties. In addition, $$X = \begin{bmatrix} p \\ \dot{p} \\ q \\ \dot{q} \end{bmatrix}, u = \begin{bmatrix} \delta l_1 \\ \delta l_2 \\ \delta l_3 \\ \delta l_4 \end{bmatrix}$$

denote the vectors of systems states and inputs, and $$p = \begin{bmatrix} x \\ y \\ z \end{bmatrix}, q = \begin{bmatrix} \theta_x \\ \theta_y \\ \theta_z \end{bmatrix} = \begin{bmatrix} \psi \\ \theta \\ \phi \end{bmatrix}$$

denote the moving platform position and orientation, respectively. $\delta l_i$ denotes the ith cable unstreteched length which are considered as the input to the cable robot system. To check the controllability condition of the robot, the controllability matrix Q is written as:

$$Q = [B \; AB \; A^2 B \; \ldots \; A^{11} B]$$

In case of having a full rank Q, the cable robot is controllable in all six DOFs. Matrix Q is 12×12 and if its rank is 12, it means that the cable robot is fully controllable in all 6 DOF of the moving platform. Calculation however shows that the rank of Q for any point of the cable robot workspace is 6 meaning that the vibrations of the moving platform can be controlled only in three DOFs. To provide an example, matrices A and B, for the equilibrium point X=0_(12×1) where the cable lengths are [0.5924, 0.5924, 0.5686, 0.5686]^T are:

$$A = \begin{bmatrix} 0 & 0 & 0 & 1.0 & 0 & 0 & 0 & 0 & 0 & 0 & 0 & 0 \\ 0 & 0 & 0 & 0 & 1.0 & 0 & 0 & 0 & 0 & 0 & 0 & 0 \\ 0 & 0 & 0 & 0 & 0 & 1.0 & 0 & 0 & 0 & 0 & 0 & 0 \\ -114.0 & 0 & 0 & 0 & 0 & 0 & 0 & 0 & -1.35 & 0 & 0 & 0 \\ 0 & -75.5 & 0 & 0 & 0 & 0 & 0 & 0 & 0 & 0 & 0 & 0 \\ 0 & 0 & -70.2 & 0 & 0 & 0 & 0.416 & 0 & 0 & 0 & 0 & 0 \\ 0 & 0 & 0 & 0 & 0 & 0 & 0 & 0 & 0 & 1.0 & 0 & 0 \\ 0 & 0 & 0 & 0 & 0 & 0 & 0 & 0 & 0 & 0 & 1.0 & 0 \\ 0 & 0 & 0 & 0 & 0 & 0 & 0 & 0 & 0 & 0 & 0 & 1.0 \\ 0 & 0 & 191.0 & 0 & 0 & 0 & -153.0 & 0 & 0 & 0 & 0 & 0 \\ 0 & 0 & 0 & 0 & 0 & 0 & 0 & -1866.0 & 0 & 0 & 0 & 0 \\ -108.0 & 0 & 0 & 0 & 0 & 0 & 0 & 0 & -1799.0 & 0 & 0 & \square \end{bmatrix}$$

$$B = \begin{bmatrix} 0 & 0 & 0 & 0 \\ 0 & 0 & 0 & 0 \\ 0 & 0 & 0 & 0 \\ 37.9 & -37.9 & 18.7 & -18.7 \\ -12.7 & -12.7 & 7.06 & 7.06 \\ 0 & 0 & 0 & 0 \\ 0 & 0 & 0 & 0 \\ 0 & 0 & 0 & 0 \\ 0 & 0 & 0 & 0 \\ 0 & 0 & 0 & 0 \\ 0 & 0 & 0 & 0 \\ 196.0 & -196.0 & -100.0 & 100.0 \end{bmatrix}$$

which results in a controllability matrix Q with rank 6.

By limiting the motion of the platform to the planar DOFs of x, y and $\theta_z$, we obtain a full-rank matrix Q which demonstrates that the illustrated platform vibrations in z, $\theta_x$ and $\theta_y$ directions are not controllable.

In order to address the controllability problem, the system of FIG. 2 may be implemented.

Figure 17:
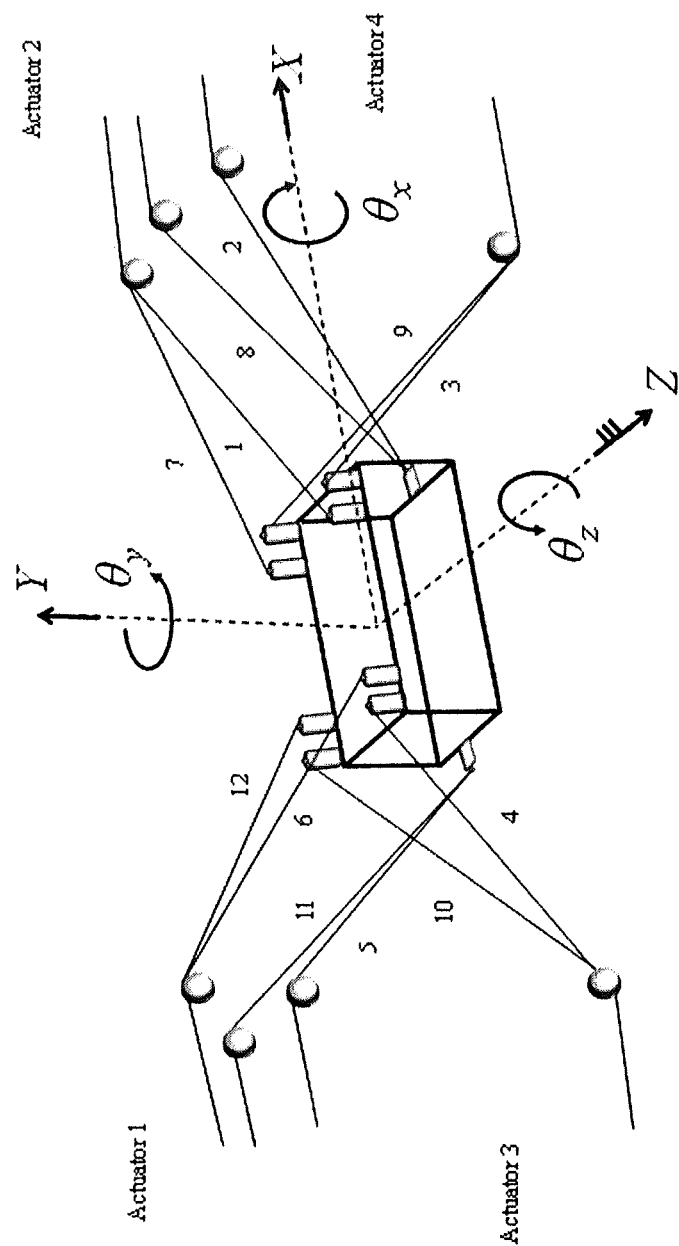
FIG. 17 is schematic diagram of a planar cable robot.

By adding the reaction system, the dynamic equation of the pendulums needs to be added to the robot equations of motion. To derive the equations with the multi-axis reaction system with two pendulums attached to the platform as shown in FIG. 17, the Lagrangian method can be used. This can be done by calculating the Lagrangian (L) which can be formed as:

$$L = (T) - (V)$$

where $$T = T_p + T_{a,1} + T_{a,2}$$

and $$V = V_p + \sum_{i=1}^{n} V_{c,i} + V_{a,1} + V_{a,2}$$

are the total kinetic and potential energy of the whole system. $V_{c,i}$ is the potential energy of ith cable, $T_p$ and $V_p$, denote the kinetic and potential energy of the platform, and $T_{a,i}$ and $V_{a,i}$ denote those of ith pendulum. Considering the platform motion, $T_p$ and $V_p$ are defined by:

$$T_p = \tfrac{1}{2} m_p (\dot{p} \cdot \dot{p}) + \tfrac{1}{2} \omega^T I_p \omega$$

$$V_p = m_p \vec{g}(p \cdot \hat{j})$$

where p, $l_p$, $m_p$, denote the combined platform and multi-axis reaction system center of gravity position vector, moment of inertia, mass, and ω indicates the angular velocity of the platform. Considering $k_i$ as the stiffness of cable i, $V_{c,i}$ can be found as:

$$V_{c,i} = \tfrac{1}{2} k_i (l_i - \delta l_i)^2$$

The kinetic energy and gravitational potential energy terms for the cables are zero since they are assumed to be massless for simplicity. In order to define the kinetic and potential energy terms for each of the i pendulum, it is first necessary to obtain an expression of their rotational and translation velocities.

The motion of the pendulum center of mass depends on the actuator's rotational motion and the platform motion. The location of the centre of mass of pendulum i with respect to the ground, $p_{a,i}$, is found to be:

$$p_{a,i} = p + R_b^g (r_{a,i} + l_{a,i})$$

where $R_b^g$, $r_{a,i}$, and $l_{a,i}$ denote the rotational matrix to transform the vectors from the platform coordinate system to the ground coordinate system, the pendulum center of mass position vector with respect to its axis, and the vector of pendulum connection point with respect to the platform center of mass.

Taking the time derivative of this equation, the pendulum velocity is then:

$$\dot{p}_{a,i} = \dot{p} + R_b^g [(\omega_p \times r_{a,i}) + (\omega_{a,i} \times l_{a,i})]$$

The angular velocity is simply the sum of the angular velocity of the pendulum about its revolute joint, $\dot{\theta}_{a,i}$ with the angular velocity of the platform. Namely:

$$\omega_{a,i} = \omega + \dot{\theta}_{a,i}$$

Accordingly, the kinetic energy of the ith pendulum is defined as:

$$T_{a,i} = \tfrac{1}{2} m_{a,i} (\dot{p}_{a,i} \cdot \dot{p}_{a,i}) + \tfrac{1}{2} \omega_{a,i}^T I_{a,i} \omega_{a,i}$$

and the potential energy for the ith pendulum:

$$V_{a,i} = m_{a,i} (g \cdot p_{a,i})$$

Providing the kinetic and potential energies of different parts, L is obtained. Accordingly, the Euler-Lagrange equations for the state variables associated with the mobile platform and the two pendulums become:

$$\frac{d}{dt}\left\{\frac{\partial L}{\partial \dot{p}}\right\} - \frac{\partial L}{\partial p} = 0$$

$$\frac{d}{dt}\left\{\frac{\partial L}{\partial \dot{q}}\right\} - \frac{\partial L}{\partial q} = 0$$

$$\frac{d}{dt}\left\{\frac{\partial L}{\partial \dot{\theta}_{a,1}}\right\} - \frac{\partial L}{\partial \theta_{a,1}} = \tau_{a,1}$$

$$\frac{d}{dt}\left\{\frac{\partial L}{\partial \dot{\theta}_{a,2}}\right\} - \frac{\partial L}{\partial \theta_{a,2}} = \tau_{a,2}$$

where $\tau_{a,1}$ and $\tau_{a,2}$ are the applied torques for the two pendulums. After solving the Euler-Lagrange equations, the dynamic equations can be linearized using Taylor series expansion which results in a linear state space model as:

$\dot{X} = A_{16 \times 16} X + B_{16 \times 6} u$

For the combined system, the state and input vectors, X and u will be:

$$X = \begin{bmatrix} p \\ \dot{p} \\ q \\ \dot{q} \\ \theta_{a,1} \\ \dot{\theta}_{a,1} \\ \theta_{a,2} \\ \dot{\theta}_{a,2} \end{bmatrix}, \quad u = \begin{bmatrix} \delta l_1 \\ \delta l_2 \\ \delta l_3 \\ \delta l_4 \\ \tau_{a,1} \\ \tau_{a,2} \end{bmatrix}$$

where $\theta_{a,1}$ and $\theta_{a,2}$ are the angles of the pendulums and $\tau_{a,1}$ and $\tau_{a,s}$ denote corresponding actuators' torque. As a result, the size of matrices A and B are 16×16 and 16×6, respectively.

Using the parameters shown below:

| Parameter | Value |
|---|---|
| $m_{a,i}$ | 0.6 kg |
| $I_{a,i}$ | $\begin{bmatrix} 655 & 0 & 0 \\ 0 & 483 & 0 \\ 0 & 0 & 191 \end{bmatrix}$ Kg·mm² |
| $r_{a,i}$ | $[0.2325, -0.0480, 0]^T$ m |
| $r_{a,i}$ | $[-0.2325, -0.0480, 0]^T$ m |
| $l_{a,i}$ | $[0, -0.05, 0]^T$ m | the matrices for the same position of the moving platform become:

$$A_{1:16 \times 1:9} = \begin{bmatrix} 0 & 0 & 0 & 1.0 & 0 & 0 & 0 & 0 & 0 \\ 0 & 0 & 0 & 0 & 1.0 & 0 & 0 & 0 & 0 \\ 0 & 0 & 0 & 0 & 0 & 1.0 & 0 & 0 & 0 \\ -102.0 & 0 & 0 & 0 & 0 & 0 & 0 & 0 & 5.11 \\ 0 & -69.5 & 0 & 0 & 0 & 0 & 0 & 0 & 0 \\ 0 & 0 & -70.0 & 0 & 0 & 0 & -0.982 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 66.0 & 0 & 0 & 0 & -172.0 & 0 & 0 \\ 0 & 0 & 0 & 0 & 0 & 0 & 0 & -1633.0 & 0 \\ -31.9 & 0 & 0 & 0 & 0 & 0 & 0 & 0 & -1200.0 \\ 0 & 0 & 0 & 0 & 0 & 0 & 0 & 0 & 0 \\ 0 & 0 & 999.0 & 0 & 0 & 0 & 87.5 & -5299.0 & 0 \\ 0 & 0 & 0 & 0 & 0 & 0 & 0 & 0 & 0 \\ 0 & 0 & 999.0 & 0 & 0 & 0 & 87.5 & 5299.0 & 0 \end{bmatrix}$$

$$A_{1:16 \times 10:16} = \begin{bmatrix} 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0.423 & 0 & 0.423 & 0 \\ 1.0 & 0 & 0 & 0 & 0 & 0 & 0 \\ 0 & 1.0 & 0 & 0 & 0 & 0 & 0 \\ 0 & 0 & 1.0 & 0 & 0 & 0 & 0 \\ 0 & 0 & 0 & 8.0 & 0 & 8.0 & 0 \\ 0 & 0 & 0 & -6.83 & 0 & 6.83 & 0 \\ 0 & 0 & 0 & 0 & 0 & 0 & 0 \\ 0 & 0 & 0 & 0 & 1.0 & 0 & 0 \\ 0 & 0 & 0 & -162.0 & 0 & 19.1 & 0 \\ 0 & 0 & 0 & 0 & 0 & 0 & 1.0 \\ 0 & 0 & 0 & 19.1 & 0 & -162.0 & 0 \end{bmatrix}$$

$$B = \begin{bmatrix} 0 & 0 & 0 & 0 & 0 & 0 \\ 0 & 0 & 0 & 0 & 0 & 0 \\ 0 & 0 & 0 & 0 & 0 & 0 \\ 33.2 & -33.2 & 17.0 & -17.0 & 0 & 0 \\ -11.3 & -11.3 & 6.3 & 6.3 & 0 & 0 \\ 0 & 0 & 0 & 0 & -1.44 & -1.44 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & -27.2 & -27.2 \\ 0 & 0 & 0 & 0 & 23.2 & -23.2 \\ 117.0 & -117.0 & -70.0 & 70.0 & 0 & 0 \\ 0 & 0 & 0 & 0 & 0 & 0 \\ 0 & 0 & 0 & 0 & 549.0 & -65.1 \\ 0 & 0 & 0 & 0 & 0 & 0 \\ 0 & 0 & 0 & 0 & -65.1 & 549.0 \end{bmatrix}$$

Constructing the controllability matrix Q for the new linearized system reveals that its rank is 16 (full-rank) for any point of the robot workspace. Having the controllability condition satisfied, different control technique can be used for using the multi-axis reaction system for eliminating the moving platform vibration.

To demonstrate the application of the multi-axis reaction system (that was studied with respect to FIG. 17) to a real system, the approach has been tested on a warehousing cable robot. The schematic and prototype of the mechanical system are shown in FIG. 18. As mentioned before, different control techniques can be used for the control of the warehousing robot, multi-axis reaction system, and/or the combined system as long as the overall system is controllable.

Figure 19:
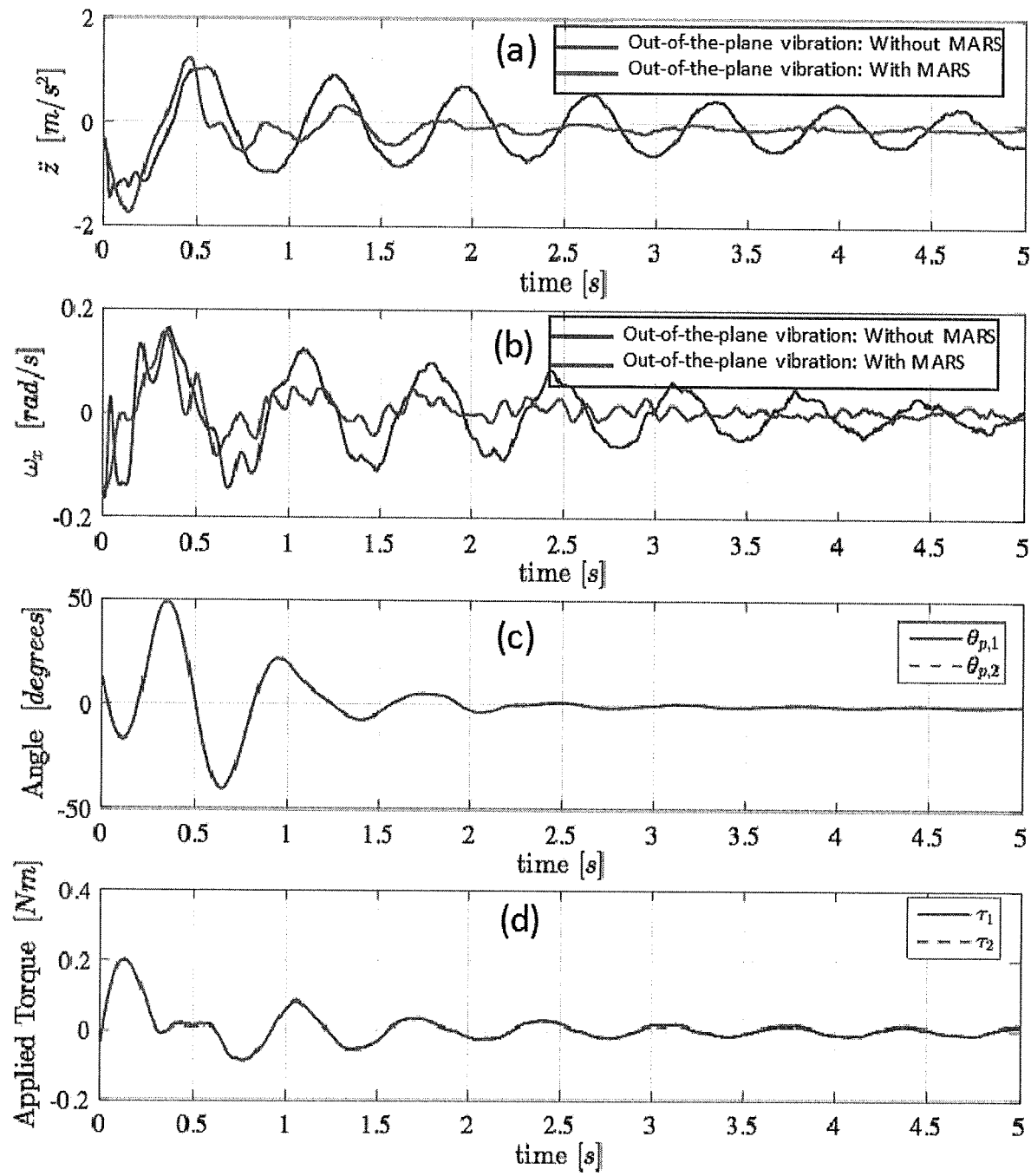
FIG. 19 is a set of graphs outlining experimental data.

In FIG. 19, graphs reflecting the vibration of the moving platform in the out-of-the-plane (Z direction) and rotational vibration about X axis with and without the multi-axis reaction system are shown. In these experiments, a sliding mode control was used to damp out the platform vibration in the two directions. As can be seen, these two vibration directions are not controllable without the multi-axis reaction system. Other control methods could also be adapted and used for the application of multi-axis reaction system in this warehousing robot. The sliding mode control is just an example to show the effect of the multi-axis reaction system in vibration control of mechanical systems.

In another embodiment of the disclosure, the movement of the motors is controlled by a processor or a controller. In another embodiment, the controller receives instructions from the processor to actuate the motors in accordance to eccentric masses movement instructions values. In another embodiment, the controller for controlling the system for vibration control may be the same or may be different from the controller for controlling the mechanical system.

Furthermore, although various embodiments of the innovation have been discussed above, it will be understood that any number of eccentric and concentric masses are contemplated which may be able to provide the necessary forces to counteract the unwanted vibrations.

In the preceding description, for purposes of explanation, numerous details are set forth in order to provide a thorough understanding of the embodiments. However, it will be apparent to one skilled in the art that these specific details may not be required in order to practice the invention. In some instances, well-known structures may be shown in block diagram form in order not to obscure the invention. For example, specific details are not provided as to whether the embodiments of the disclosure described herein are implemented as a software routine, hardware circuit, firmware, or a combination thereof.

Various embodiments are described herein. Variations of those embodiments may become apparent to those of ordinary skill in the art upon reading the foregoing description. It is expected that skilled persons will employ such variations as appropriate, and it is expected that the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Further variations may be apparent or become apparent to those knowledgeable in the field, and are within the scope as defined by the claims.

What is claimed is:

1. Apparatus for vibration control of unpredicted vibrations within a mechanical system comprising:
    a mounting structure to connect the apparatus for vibration control to a portion of the mechanical system;
    a set of at least two motors connected to the mounting structure, the set of motors including at least two motors co-linear with each other along a motor axis of rotation, the motor axis of rotation parallel to the portion of the mechanical system to which the mounting structure is connected; and
    a set of eccentric masses, the set of eccentric masses in a one-to-one relationship with the set of at least two motors;
    wherein movement of the set of eccentric masses to address the vibration control include oscillatory movement of the set of eccentric masses; and
    wherein the movement of the set of eccentric masses is in response to the unpredicted vibrations within the mechanical system to reduce vibrational movement and provide the vibration control.

2. The apparatus of claim 1 wherein each of the set of eccentric masses is connected to its associated motor at the motor axis of rotation.

3. The apparatus of claim 1 wherein an eccentric mass axis of rotation is different than the motor axis of rotation.

4. The apparatus of claim 1 wherein the set of eccentric masses comprises:
    at least two pendulum-shaped eccentric masses, wherein two of the at least two pendulum-shaped eccentric masses are connected to its associated motor at the motor axis of rotation.

5. The apparatus of claim 4 wherein the set of eccentric masses further comprises a rotational disc eccentric mass connected to a motor within the set of at least two motors.

6. The system of claim 4 wherein the mechanical system is a cable robot including a platform.

7. The system of claim 6 wherein the mounting structure is connected to the platform.

8. The system of claim 7 wherein the mounting structure is connected to a bottom of the platform.

9. The apparatus of claim 1 wherein the set of eccentric masses comprise:
    three pairs of pendulum-shaped eccentric masses, each of the three pair of pendulum-shaped eccentric masses connected to individual motors within the set of at least two motors along an axis of rotation of the mechanical system; and
    three rotational disc eccentric masses, each of the rotational disc eccentric masses connected to individual motors within the set of at least two motors along one of the axes of rotation of the mechanical system.

10. The apparatus of claim 1 wherein the movement of the set of eccentric masses is to control the unpredicted vibrations.

11. The apparatus of claim 10 wherein the movement of the set of eccentric masses is adjusted based on the unpredicted vibrations.

12. A system for vibration control for a mechanical system comprising:
    a set of at least two motors, the set of motors co-linear with each other along a motor axis of rotation;
    a set of at least two eccentric masses, the set of at least two eccentric masses connected to each of the set of at least two motors at the motor axis of rotation;
    wherein actuation of each of the set of at least two motors causes the set of at least two eccentric masses to oscillate; and
    wherein the actuation of each of the set of at least two motors is in response to unpredicted vibrations experienced by the mechanical system to reduce vibrational movement and provide the vibration control.

13. The system of claim 12 wherein the set of at least two eccentric masses is in a one-to-one relationship with the set of at least two motors.

14. The system of claim 12 wherein a center of gravity of each of the set of at least two eccentric masses is displaced from the motor axis of rotation.

15. The system of claim 12 wherein the actuation of each of the set of at least two motors is to control the unpredicted vibrations.

* * * * *